(12) United States Patent
Hicks et al.

(10) Patent No.: US 7,638,587 B2
(45) Date of Patent: Dec. 29, 2009

(54) VERDAZYL AGENTS FOR THE PRODUCTION OF FREE STANDING POLYMERS

(75) Inventors: Robin Gary Hicks, Victoria (CA); Michael Georges, University of Toronto at Mississauga Department of Chemistry 3359 Mississauga Rd., Mississauga, Ontario L5L-1C6 (CA)

(73) Assignees: University of Victoria Innovation and Development Corporatin, Victoria (CA); Michael Georges, Guelph, Ontario (CA)

( * ) Notice: Subject to any disclaimer, the term of this patent is extended or adjusted under 35 U.S.C. 154(b) by 30 days.

(21) Appl. No.: 11/737,046

(22) Filed: Apr. 18, 2007

(65) Prior Publication Data

US 2007/0244274 A1 Oct. 18, 2007

Related U.S. Application Data

(60) Provisional application No. 60/793,109, filed on Apr. 18, 2006.

(51) Int. Cl.
C08F 2/38 (2006.01)
C07D 257/12 (2006.01)
(52) U.S. Cl. .................. 526/204; 544/179; 526/218.1; 526/346
(58) Field of Classification Search .......... 526/82, 526/261, 303.1, 319, 341, 346; 544/179; 423/365
See application file for complete search history.

(56) References Cited

U.S. PATENT DOCUMENTS

| | | | | |
|---|---|---|---|---|
| 4,427,835 A | * | 1/1984 | Bush et al. | 525/293 |
| 5,530,079 A | * | 6/1996 | Veregin et al. | 526/219.3 |
| 5,891,971 A | * | 4/1999 | Keoshkerian et al. | 526/210 |
| 2006/0229471 A1 | * | 10/2006 | Suzuki | 564/253 |

FOREIGN PATENT DOCUMENTS

WO    WO 2005/009613    * 2/2005    ........... 564/253

OTHER PUBLICATIONS

O.M. Polumbik, Advances in the Chemistry of Verdazyl Radicals, 1978, Russian Chemical Reviews, 47(8), 767-785.*
A.M. Nesterenko et al. CAPlus Accession No. 1984:610101. Quantum-chemical study of the effect of substituents on the reactivity of free radicals. I. Sym-tetrazinyls. Zhurnal Organicheskoi Khimii, 1984, 20, 1465-1474.*

* cited by examiner

*Primary Examiner*—Randy Gulakowski
*Assistant Examiner*—Brieann R Fink
(74) *Attorney, Agent, or Firm*—Klarquist Sparkman, LLP

(57) ABSTRACT

The present disclosure concerns embodiments of a method of synthesizing polymers using verdazyl agents selected for their property of being moderately unstable free radicals. In one embodiment of the invention a method of synthesizing free standing polymers from suitably selected polymerizable subunits, such as monomers, is provided. In another embodiment of the invention a combination for the synthesis of free standing polymers from suitably selected polymerizable subunits using moderately unstable verdazyls is provided. Using moderately unstable verdazyls permits lower reaction temperatures and faster reaction times, while yielding polymers with low polydispersity.

11 Claims, 9 Drawing Sheets

A

B

C

D

Prior Art

Prior Art

Type 1

Type 2

Prior Art

Prior Art

A

B

C

D

A

B

VERDAZYL AGENTS FOR THE PRODUCTION OF FREE STANDING POLYMERS

CROSS REFERENCE TO RELATED APPLICATION

This application claims the benefit of the earlier filing date of U.S. patent application No. 60/793,109, entitled Verdazyl Agents for the Production of Free Standing Polymers, which was filed on Apr. 18, 2006, and is incorporated herein by reference.

FIELD

The disclosed embodiments concern a method of synthesizing free standing polymers using moderately unstable verdazyl agents or unimers to control chain length. The disclosed embodiments also concern a composition comprising moderately unstable verdazyl agents or unimers for the synthesis of free standing polymers.

BACKGROUND

Polymer materials have been instrumental in improving the health and living conditions of the world's growing populations by providing cheap and durable materials for such varied applications as highway and building construction, water purification systems, medical applications and food packaging. The major end users of polymeric materials in Canada are plastic manufacturers with the polymer cost accounting for 30 to 50% of the final value on a plastic product. The Canadian industry for plastics involving 1200 companies was valued at US $5.56 billion in 1997 with Canadian producers exporting 60% of their polymer products. According to a report prepared in 2000 by the Canadian Plastics Producers, the Canadian and worldwide demand for plastic products is expected to grow faster than the economy as a whole, with an annual growth rate of 5 to 7% worldwide until 2008. Fueling that growth, it is stated, will be products with improved performance. As we move into the 21st century the performance demands on polymers are increasing as they are applied to ever more demanding and sophisticated applications, in particular, microelectronics and nanotechnology. The challenge for the polymer chemist is to develop new understanding and insight into existing or new technologies to enable the synthesis of these materials in a predictable, precise and cost-efficient manner.

In the last few decades, polymer chemistry has evolved from a physical science, in which the focus has been on measuring physical properties and studying kinetic issues on commercially available polymers, to a synthetic science where the creative design and synthesis of precision materials is the focus. The key means of achieving control over polymer properties is to control the molecular weight (MW) and polydispersity (PD) of the polymerization process. Living polymerization processes offer precisely this potential. In these processes, chain transfer and termination reactions that are endemic to most conventional polymerizations are reduced. This allows polymer growth to occur with excellent MW control and very low polydispersity indices (PDIs), and also permits the synthesis of block copolymers and polymer materials with complex macromolecular architecture. There are several different kinds of living polymerization processes, all with specific strengths as well as challenges for their exploitation for commercial impact.

A. Living Radical Polymerization

Living-radical polymerization is a relatively new class of living polymerization that has great potential for eventual commercial impact. Living-radical polymerization is positioned to be successful because (i) it is built on the foundation of the conventional radical polymerization process, which is already commercially successful and dominant, (ii) it is economical to perform, (iii) it can provide the control that is required for the new generation of polymeric materials and (iv) the infrastructure required to do these polymerizations is already in place in industry and the transition of living-radical polymerization to an industrial setting can be accomplished with minimal extra-capital expenditure.

The basic premise for living radical polymerization processes is outlined in simplified form in FIG. 1. Under conventional radical polymerization conditions, the growing reactive polymer chains Pn. are subject to various bimolecular termination and chain transfer reactions. However, the introduction of a terminating species T. (typically at a few mol % level) which can react quickly and reversibly with Pn. sets up an equilibrium between dissociated ("active") polymer radical and polymer bound to T. ("dormant" form, Pn.T) which cannot react with monomer. The concentration of active polymer P. is controlled such that bimolecular chain/termination reactions are minimized, while reactions with monomer (propagation) can still occur at appreciable rates. These features convert the conventional polymerization process into one displaying the hallmarks of a living polymerization—linear growth in molecular weight versus monomer conversion, low PDI (<1.5), and the ability to perform chain extension reactions and block copolymer synthesis. As a result, living radical polymerization has become one of the most intensively studied areas in polymer synthesis in the past several years.

Currently there are three major classes of living-radical polymerization processes: Atom Transfer Radical Polymerization (ATRP), Reverse Addition Fragmentation Chain Transfer polymerization (RAFT), and Stable Free Radical Polymerization (SFRP). While there are mechanistic subtleties that distinguish all three processes, the first two share a common feature in that the terminating species T. in FIG. 1 is not a "free" radical when dissociated from Pn.; rather, T. is reversibly transferred between Pn. and another species (transition metal species in the case of ATRP and organosulfur compounds in RAFT). In SFRP the dissociated species T. is a stable radical. All three processes have different strengths and weaknesses, but at present each of the major living-radical systems has outstanding issues which currently limit their commercial viability.

Among the three living radical systems, SFRP stands out as an attractive process with considerable commercial potential because (a) it does not suffer from metal contamination of the polymer (as do ATRP derived polymers) and (b) SFRP-based processes are considerably more robust and less capricious than RAFT polymerizations. Effective SFRP processes were first reported in 1993, when it was demonstrated that high molecular weight (MW) polymers could be synthesized with molecular weight distributions (MWDs) narrower than what was considered theoretically possible at the time for a free radical polymerization process. The key to the SFRP process is the use of a stable free radical which does not initiate the polymerization but can reversibly terminate growing polymer chains. In a typical polymerization (FIG. 1), an initiator molecule initiates the growth of the polymer chains (Pa), which very quickly react with T.—in this case, TEMPO (FIG. 2), a stable nitroxide radical—to give dormant TEMPO-terminated polymer chains (Pa.T). As heating is continued, the relatively weak bond between the polymer chains and TEMPO breaks. This releases reactive polymer chains with free radical functionality on the terminal monomer unit. The reactive polymer chains then react with more monomer and increase in length. At some point the growing polymer chains react again with TEMPO to form longer TEMPO-terminated polymer chains (Pb.T). This cycle repeats itself until the monomer is consumed. Thus, as long as there is monomer (M) present, the polymer chains continue to grow in a controlled fashion where the molecular weight of the polymer is predicted by the amount of chains initiated and the amount of monomer used.

Several stable radical species have been explored for SFRP purposes, but by far the dominant class of radicals that have been studied are the nitroxides R2NO., typified by TEMPO. Nitroxides have been subjected to intense studies which have led to a better understanding of the specifics of the nitroxide-mediated SFRP process as well as progress in the efficacy of these systems. However there is still significant room for improvement. For example, nitroxide-mediated SFRP works very well for polystyrene production, but in the important class of acrylate- and methacrylate-based polymers there are still outstanding issues. Specific nitroxides have been developed that can mediate SFRP of some acrylates, but these nitroxides are very difficult to prepare and handle because of their instability. To date nitroxides have not been demonstrated to successfully mediate the SFRP of methacrylates.

In U.S. Pat. No. 6,114,499 discloses a stable free radical mediated polymerization process that provide homopolymer and copolymer resin products that possess narrow polydispersity properties and a high monomer to polymer conversion. In particular, U.S. Pat. No. 6,114,499 relates to stable free radical mediated or pseudoliving polymerization processes that yield branched homopolymers and copolymers having number average molecular weights ($M_n$) above about 100 to about 200,000 and having a polydispersity ratio of the weight average molecular weight ($M_w$) to the number average molecular weight ($M_n$) of from about 1.0 to about 2.0. While the results disclosed are specific to nitroxides, examples of suitable and preferred stable free radicals are disclosed in U.S. Pat. No. 6,114,499 by reference to U.S. Pat. No. 3,600,169. These include: nitrogen-centered stable free radical such as organic hydrazyls, verdazyls, and pyridinyl compounds; non-nitroxide oxygen centered stable free radicals such as aroxyls and the like; and carbon centered stable free radicals such as aryl alkyls and aryl cycloalkyls with the unpaired electron residing on a carbon atom in the alkyl or cycloalkyl substituents.

U.S. Pat. No. 6,068,688 discloses modified particles for use in living free radical polymerization. The stable free radicals contemplated in that patent include nitroxide free radicals such as 2,2,5,5-tetramethyl-pyrrolidinyloxy and 2,2,6,6-tetramethyl-piperindinyloxy, organic hydrazyl compounds, organic verdazyl compounds, organic aroxyl compounds (e.g., 2,4,6 tri-tertiary butyl phenoxy radical, gaivinoxyl (2,6 ditertiary butyl alpha 3,5 ditertiary butyl oxo 2,5 cyclohexadiene-1 ylidene para tolyoxy) radical), aryl alkyl or aryl cycloalkyl where the unpaired electron is on a carbon atom, substituted triphenyl methyl, substituted triphenyl amine, and derivatives of these compounds. The polymer synthesized using the modified particles is necessarily attached to the particle, and hence is not free standing.

As noted above, verdazyls have been suggested for use in SFRP. This is because they have been identified as stable free radicals. However, work on one class of these, the type 1 verdazyls, (see FIG. 3) has shown that they were not very effective in controlling styrene polymerization. This may indicate that the assumed relationship between stable free radicals and superior reduction in chain termination during polymerization is erroneous. Certainly, Ananchenko et al. (Ananchenko, G. S.; Souaille, M.; Fischer, H.; Mercier, C. L.; Tordo, P, J. Polym. Sci., Part A: Polym. Chem., 2002, 40, 3264-3283) argue that the rates of polymerization are controlled by the bond dissociation energy of the bond between the stable free radical moiety and the end of the propagating polymer chain and therefore, suggesting a mechanism that is not reliant on the stability of the stable free radical.

In support of this notion, it is known that during the course of SFRP reactions using nitroxide, small amounts of termination reactions occur which gradually and irreversibly consume active polymer chains. This leads to a buildup of excess radical (nitroxide) which shifts the equilibria in FIG. 1 to the dormant side, thereby shutting down the reaction. There have been several approaches to circumventing this for nitroxides by using additives that react with the excess nitroxide. These additives serve to destroy the nitroxide. Despite this, there has, to our knowledge, not been attempts to identify and use inherently moderately unstable free radicals in SFRP reactions.

It is an objective of the disclosed embodiment to overcome the deficiencies in the prior art.

SUMMARY

The present invention provides a method of synthesizing polymers using verdazyl agents selected for their property of being moderately unstable free radicals. A moderately unstable verdazyl is one that will decompose at a rate that is similar to the rate of polymer termination. A person of ordinary skill in the art will appreciate that the ideal rate of decomposition will not be a universal rate, but instead will be specific considering, inter alia, each monomer, each radical type, and polymerization reaction conditions. By way of example, for styrene polymerizations with disclosed verdazyl agents the radical decomposes at an approximate rate of 0.000006 mole of radical per mole of monomer per minute. This characteristic of being moderately unstable allows verdazyl agents to be highly desirable for use in the SFRP process. As moderately unstable radicals they fulfill the general requirements for the SFRP process and, as outlined below, they may prove to be more versatile, scientifically useful and, in the long run, economically more advantageous or viable than the nitroxide technology.

One embodiment of a method for synthesizing free-standing polymers from suitably selected polymerizable subunits, such as monomers, comprises: providing suitably selected polymerizable subunits; providing a moderately unstable free radical verdazyl agent; initiating synthesis of the free standing polymer; inhibiting termination of the free standing polymer with the moderately unstable free verdazyl agent; and forming the free standing polymer. "Free standing" as used herein means that the polymer is not attached or absorbed onto another substrate, such as a solid particle.

In another aspect of the disclosed embodiment a free standing polymer is produced with a monodispersity from about 1.0 to about 1.5.

In another aspect of the disclosed embodiments, the method is conducted at temperatures of from about 80° C. to about 140° C.

In another aspect of the disclosed embodiments, the method is conducted at temperatures of from about 90° C. to about 120° C.

In another aspect of the disclosed embodiments, the method is conducted at temperatures of from about 90° C. to about 100° C.

In yet another aspect of the disclosed embodiments, the moderately unstable free radical verdazyl agent is selected from the group consisting of verdazyls having a carbonyl group at $C_6$.

In yet another aspect of the disclosed embodiments, the moderately unstable free radical verdazyl comprises a phenyl group at $R_1$.

In yet another aspect of the disclosed embodiments, the moderately unstable free radical verdazyl agent is selected from the group consisting of verdazyls having an sp3 carbon at $C_6$.

In yet another aspect of the disclosed embodiments, the moderately unstable free radical verdazyl comprises at least one phenyl group.

One disclosed embodiment concerns a method for the synthesis of free standing polymers using moderately unstable verdazyl agents. The polymers include polymers based on n-butyl acrylate, styrenes, acrylates, including n-butyl acrylate, methacrylates, including methyl methacrylate, acrylonitriles, and acrylamides. The polymer products of the disclosed embodiments include homopolymers, copolymers, tapered copolymers, block copolymers, star and comb copolymers, branched copolymers, and dendridic copolymers.

In yet another aspect of the disclosed embodiments, the free standing polymer comprises polystyrene.

In yet another aspect of the disclosed embodiments, the free standing polymer comprises polymethacrylate.

In yet another aspect of the disclosed embodiments, the free standing polymer comprises poly methyl-methacrylate.

In yet another aspect of the disclosed embodiments, the free standing polymer comprises polyacrylate.

In yet another aspect of the disclosed embodiments, the free standing polymer comprises polyacrylonitriles.

In yet another aspect of the disclosed embodiments, the free standing polymer comprises polyacrylamides.

In yet another aspect of the disclosed embodiments, the free standing polymer is further defined as a copolymer comprised of two suitably selected polymerizable subunits selected from the group consisting of n-butyl acrylate, styrenes, acrylates, including n-butyl acrylate, methacrylates, including methyl methacrylate, acrylonitriles, and acrylamides.

In another disclosed embodiment, a composition for the synthesis of free standing polymers from suitably selected polymerizable subunits, such as monomers, is provided. The composition comprises suitably selected polymerizable subunits; a moderately unstable free radical verdazyl agent; and a suitably selected initiator.

In another aspect of the disclosed embodiments, the composition further comprises a suitably selected terminator.

In another aspect of the disclosed embodiments of the composition, the moderately unstable verdazyl agent is selected from the group consisting of verdazyls having a carbonyl group at $C_6$.

In another aspect of the disclosed embodiments of the composition, the moderately unstable free radical verdazyl comprises at least one phenyl group.

In another aspect of the disclosed embodiments of the composition, the moderately unstable free radical verdazyl comprises a phenyl group at $R_1$.

In another aspect of the disclosed embodiments of the composition, the moderately unstable free radical verdazyl agent is selected from the group consisting of verdazyls having an sp3 center at $C_6$.

In another aspect of the disclosed embodiments of the composition, the suitably selected polymerizable subunit comprises styrene.

In another aspect of the disclosed embodiments of the composition, the suitably selected polymerizable subunit comprises methacrylate.

In another aspect of the disclosed embodiments of the composition, the suitably selected polymerizable subunit comprises methyl-methacrylate.

In another aspect of the disclosed embodiments of the composition, the suitably selected polymerizable subunit comprises acrylate.

In another aspect of the disclosed embodiments of the composition, the suitably selected polymerizable subunit comprises acrylamides.

In another aspect of the disclosed embodiments of the composition, the suitably selected polymerizable subunit comprises acrylonitriles.

In another aspect of the disclosed embodiments of the composition, the moderately unstable free radical verdazyl comprises a phenyl group at $R_1$.

In another aspect of the embodiments of the disclosed method, the synthesis is sufficiently completed within 2 hours.

In another aspect of the disclosed embodiments of the composition, the suitably selected polymerizable subunit comprises two different suitably selected polymerizable subunits selected from the group consisting of n-butyl acrylate, styrenes, acrylates, including n-butyl acrylate, methacrylates, including methyl methacrylate, acrylonitriles, and acrylamides.

In another aspect of the disclosed embodiments, a method of synthesizing free-standing polymers from suitably selected polymerizable subunits, such as monomers is provided. The method comprises providing suitably selected polymerizable subunits; providing a moderately unstable free radical verdazyl agent; initiating synthesis of the free standing polymer; inhibiting termination of the free standing polymer with the moderately unstable free verdazyl agent; and forming the free standing polymer.

The method is conducted at temperatures of from about 80° C. to about 140° C. and is sufficiently completed within 2 hours to provide a free standing polymer having a monodispersity of from about 1.0 to about 1.5.

Another embodiment of a method for synthesizing free-standing polymers from suitably selected polymerizable subunits, such as monomers, comprises: providing suitably selected polymerizable subunits; providing a unimer; inhibiting termination of the free standing polymer with the unimer; and forming the free standing polymer. "Free standing" as used herein means that the polymer is not attached or absorbed onto another substrate, such as a solid particle.

In another aspect of the disclosed embodiment a free standing polymer is produced with a monodispersity from about 1.0 to about 1.5.

In another aspect of the disclosed embodiments, the method is conducted at temperatures of from about 80° C. to about 140° C.

In another aspect of the disclosed embodiments, the method is conducted at temperatures of from about 90° C. to about 120° C.

In another aspect of the disclosed embodiments, the method is conducted at temperatures of from about 90° C. to about 100° C.

In yet another aspect of the disclosed embodiments, the unimer is selected from the group consisting of unimers having a carbonyl group at $C_6$.

In yet another aspect of the disclosed embodiments, the unimer comprises a phenyl group at $R_1$.

In yet another aspect of the disclosed embodiments, the unimer is selected from the group consisting of unimers having an sp3 carbon at $C_6$.

In yet another aspect of the disclosed embodiments, the unimer comprises at least one phenyl group.

One disclosed embodiment concerns a method for the synthesis of free standing polymers using unimer. The polymers include polymers based on n-butyl acrylate, styrenes, acrylates, including n-butyl acrylate, methacrylates, including methyl methacrylate, acrylonitriles, and acrylamides. The polymer products of the disclosed embodiments include homopolymers, copolymers, tapered copolymers, block copolymers, star and comb copolymers, branched copolymers, and dendridic copolymers.

In yet another aspect of the disclosed embodiments, the free standing polymer comprises polystyrene.

In yet another aspect of the disclosed embodiments, the free standing polymer comprises polymethacrylate.

In yet another aspect of the disclosed embodiments, the free standing polymer comprises poly methyl-methacrylate.

In yet another aspect of the disclosed embodiments, the free standing polymer comprises polyacrylate.

In yet another aspect of the disclosed embodiments, the free standing polymer comprises polyacrylonitriles.

In yet another aspect of the disclosed embodiments, the free standing polymer comprises polyacrylamides.

In yet another aspect of the disclosed embodiments, the free standing polymer is further defined as a copolymer comprised of two suitably selected polymerizable subunits selected from the group consisting of n-butyl acrylate, styrenes, acrylates, including n-butyl acrylate, methacrylates, including methyl methacrylate, acrylonitriles, and acrylamides.

In another disclosed embodiment, a composition for the synthesis of free standing polymers from suitably selected polymerizable subunits, such as monomers, is provided. The composition comprises suitably selected polymerizable subunits; and a unimer.

In another aspect of the disclosed embodiments, the composition further comprises a suitably selected terminator.

In another aspect of the disclosed embodiments of the composition, the moderately unstable unimer is selected from the group consisting of unimers having a carbonyl group at $C_6$.

In another aspect of the disclosed embodiments of the composition, the unimer comprises at least one phenyl group.

In another aspect of the disclosed embodiments of the composition, the unimer comprises a phenyl group at $R_1$.

In another aspect of the disclosed embodiments of the composition, the unimer is selected from the group consisting of unimers having an sp3 center at $C_6$.

In another aspect of the disclosed embodiments of the composition, the suitably selected polymerizable subunit comprises styrene.

In another aspect of the disclosed embodiments of the composition, the suitably selected polymerizable subunit comprises methacrylate.

In another aspect of the disclosed embodiments of the composition, the suitably selected polymerizable subunit comprises methyl-methacrylate.

In another aspect of the disclosed embodiments of the composition, the suitably selected polymerizable subunit comprises acrylate.

In another aspect of the disclosed embodiments of the composition, the suitably selected polymerizable subunit comprises acrylamides.

In another aspect of the disclosed embodiments of the composition, the suitably selected polymerizable subunit comprises acrylonitriles.

In another aspect of the disclosed embodiments of the composition, the unimer comprises a phenyl group at $R_1$.

In another aspect of the embodiments of the disclosed method, the synthesis is sufficiently completed within 2 hours.

In another aspect of the disclosed embodiments of the composition, the suitably selected polymerizable subunit comprises two different suitably selected polymerizable subunits selected from the group consisting of n-butyl acrylate, styrenes, acrylates, including n-butyl acrylate, methacrylates, including methyl methacrylate, acrylonitriles, and acrylamides.

In another aspect of the disclosed embodiments, a method of synthesizing free-standing polymers from suitably selected polymerizable subunits, such as monomers is provided. The method comprises providing suitably selected polymerizable subunits; providing a unimer; inhibiting termination of the free standing polymer with the unimer; and forming the free standing polymer.

The method is conducted at temperatures of from about 80° C. to about 140° C. and is sufficiently completed within 2 hours to provide a free standing polymer having a monodispersity of from about 1.0 to about 1.5.

DETAILED DESCRIPTION

Figure 3:
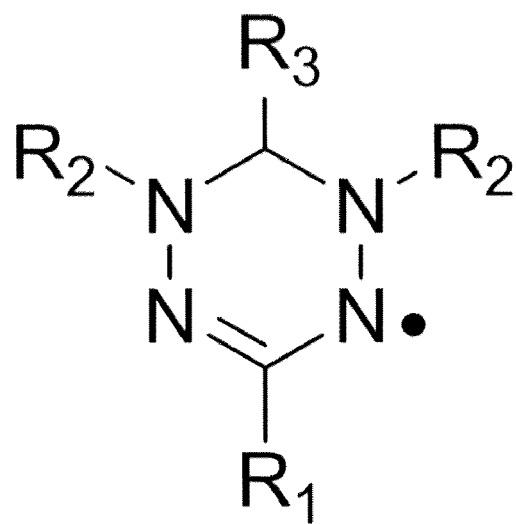
FIG. 3 shows two types of verdazyls in accordance with an embodiment of the disclosed invention.
Figure 3:
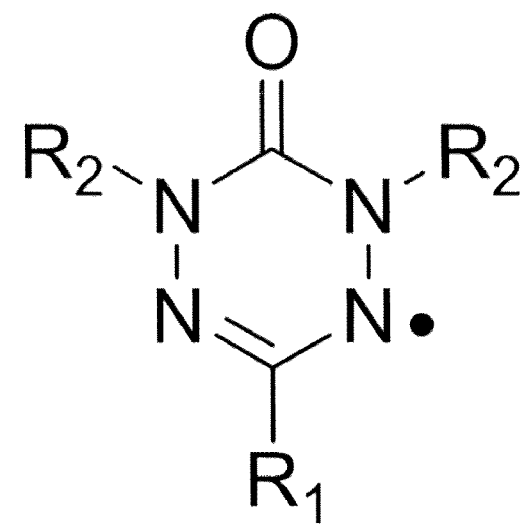

Styrene polymerization was carried out using phenyl verdazyl (see FIG. 3 for the generalized structure of a Type 2 verdazyl) as the moderately unstable free radical. A moderately unstable verdazyl is one that will decompose at a rate that is similar to the rate of polymer termination. The procedure used was as follows: Phenyl verdazyl (203 mg, 0.001 m) and Vazo™ 88 (130 mg, 0.00053m) were dissolved in 10 mL of styrene. The reaction mixture was degassed with argon for 10 minutes and the reaction mixture was heated to 130° C. for 1 hour. After 40 minutes the conversion was 40%, number average molecular weight (Mn) was 4,600 and the polydispersity was 1.26. After 60 minutes the conversion was 55%, Mn =5100 and the polydispersity was 1.24. The reaction was repeated at 115° C. and after 2 hours had a Mn =9,584, a polydispersity of 1.45 and a conversion of 65%.

Figure 4:
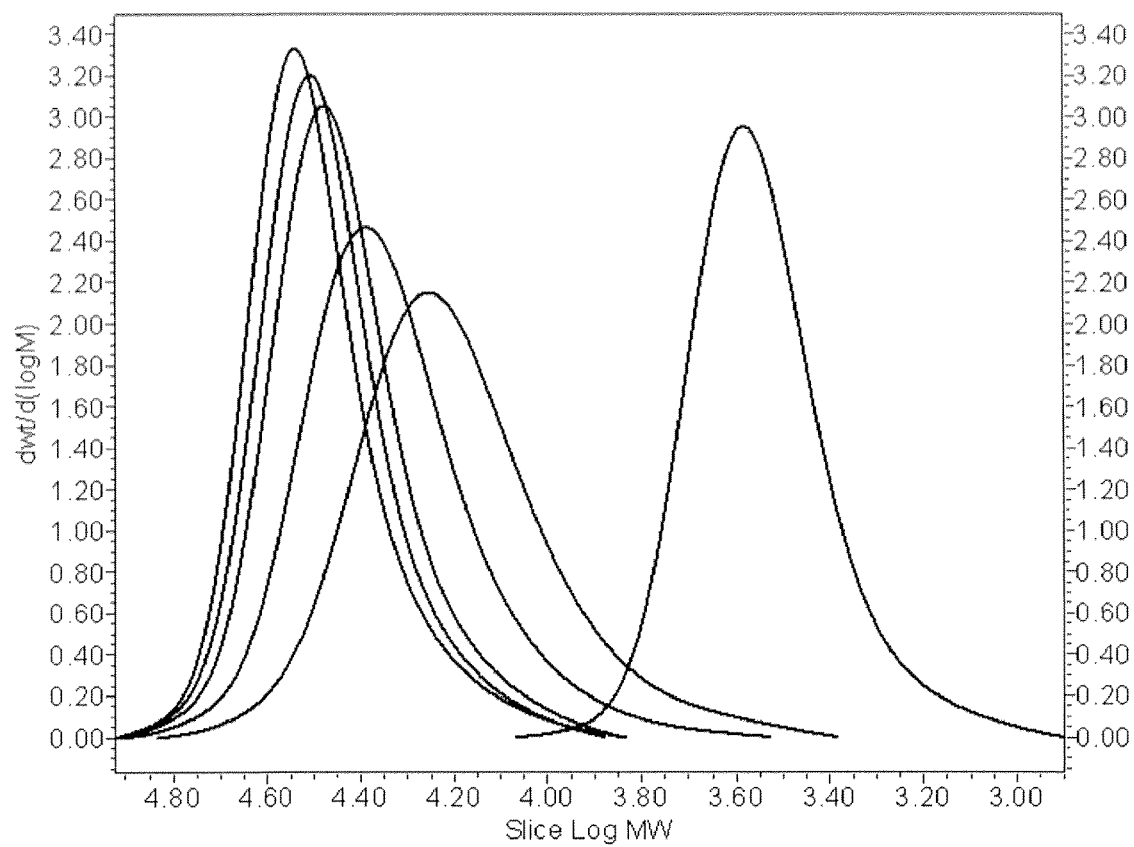
FIG. 4 shows GPC traces of molecular weight evolution for a typical synthesis in accordance with an embodiment of the disclosed invention.

These results show that this verdazyl is at least as effective as nitroxides in controlling styrene polymerization. GPC (Gel Permeation Chromatography) traces of MW evolution for a typical polystyrene runs are shown in FIG. 4; polydispersities approach 1.2-1.3. The reaction rates were faster than would be obtained using nitroxide.

A. Verdazyl Radical Syntheses

Figure 5:
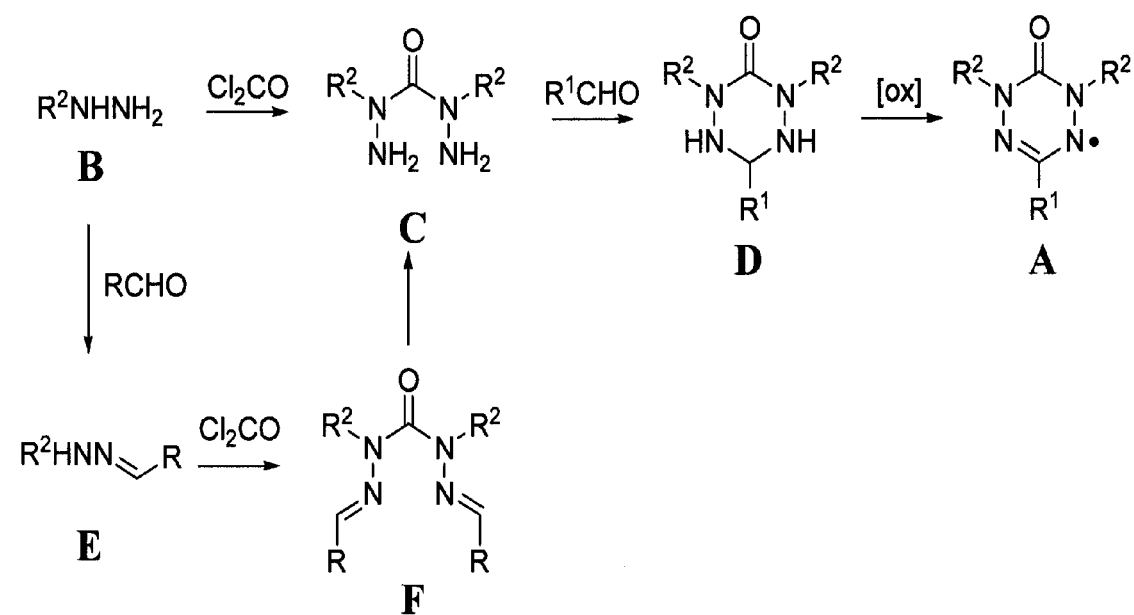
FIG. 5 shows a synthesis scheme for production of a moderately unstable free radical verdazyl in accordance with an embodiment of the disclosed invention.

General synthetic routes to verdazyl radicals have been established for some time. There are two principal strategies depicted in FIGS. 5 and 6. FIG. 5 leads to verdazyls containing carbonyl group in the ring (Type 2). The key intermediates are the bis-hydrazide reagents (C). When $R_2$ is Me or a primary alkyl group these can be made directly from the mono-substituted hydrazine (B) and phosgene (or phosgene synthons). If $R_2$ is secondary or tertiary alkyl or aryl, the bis-hydrazides must go through an $NH_2$ protection-condensation-deprotection sequence ([(B)->(E)->(F)->(C)]. The bis-hydrazides (C) react with aldehydes to yield tetrazanes (D) in excellent yields, and the final step involves oxidation using any number of reagents ($Fe(CN)_6^{3-}$, $IO_4-$, $PbO_2$, p-benzoquinone) to give the verdazyls (A). The radicals are air and water stable and are generally stable enough to be handled, stored, and transported like ordinary organic compounds without appreciable decomposition.

Figure 6:
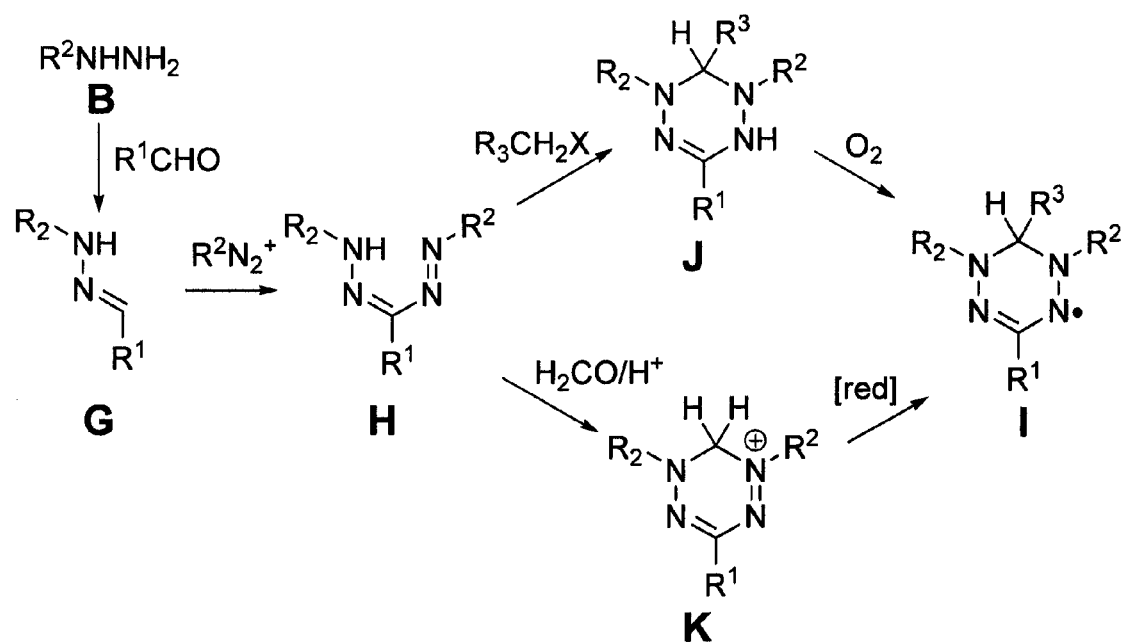
FIG. 6 shows a synthesis scheme for production of a moderately unstable free radical verdazyl in accordance with an embodiment of the disclosed invention.

Verdazyls of Type 1 containing an sp3 carbon center at $C_6$ can be made using the chemistry shown in FIG. 6. The general numbering scheme for verdazyl agents is provided below.

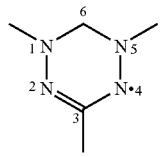

Mono-substituted hydrazines (B) are converted to hydrazones (G) and subsequently formazans (H) via diazonium salts; these work best for aryl groups, though N,N-alkyl substituted formazans are also possible via related chemistry. From here formazan alkylation leads to tetrazines (J), which are aerobically oxidized to give the radicals (I). It also is possible to access verdazyl via cationic heterocycles (K) followed by reduction. Again, these radicals are stable enough to be manipulated without any special precautions.

B. Polymerization Studies

Typical SFRP processes are run under similar conditions for conventional radical polymerization (monomer, few mol % initiator, heat, no $O_2$) but with the stable radical added as well. There are several variables—reaction temperature, the stable radical, the initiator, relative concentrations—that can be systematically varied to provide living polymerization character (molecular weight control as evidenced by linear growth versus monomer conversion, PDIs well below 1.5, chain extension). In the proposed work, a wide range of verdazyl agents that are moderately unstable will be used in the reaction rather than a stable free radical. In addition, the reactions will be conducted at as low a temperature as possible (ideally less than 100° C.), at a reasonable rate (defined as upwards of 100% conversion in 6 hours or less). These conditions are not currently achievable in the nitroxide-based SFRP.

Two polymer systems will be of primary focus. Nitroxide SFRP is now well-established for styrene-based polymers, and provides a valuable set of standards to which we can compare the verdazyl-based processes. This also permits fundamental studies aimed at getting a clearer picture of the factors that affect the verdazyls' efficacy in SFRP. The other systems are acrylate- and methacrylate-based polymers, represented by poly(n-butyl acrylate) and poly(methyl methacrylate) respectively.

C. Specific Systems

Figure 7:
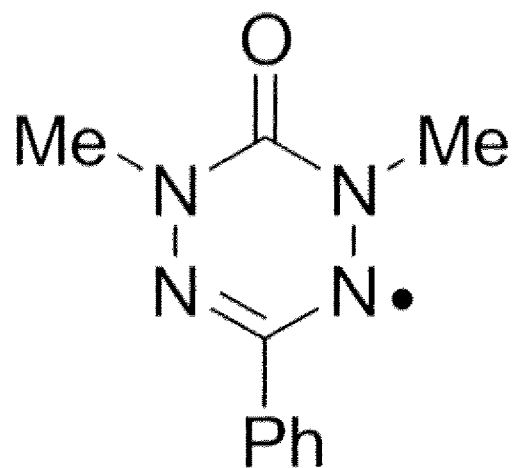
FIG. 7 shows the chemical structure of verdazyl derivatives in accordance with an embodiment of the disclosed invention.
Figure 7:
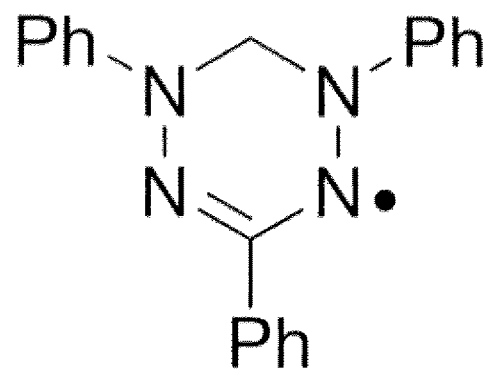
Figure 7:
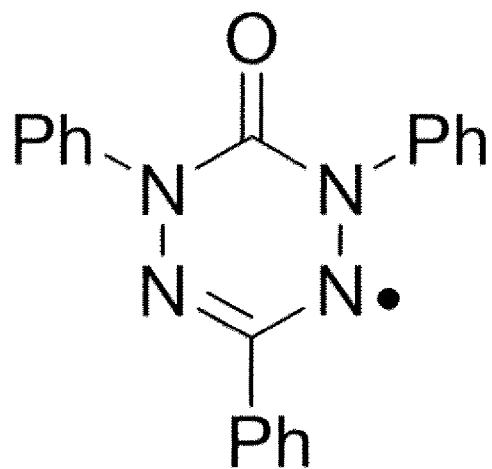
Figure 7:
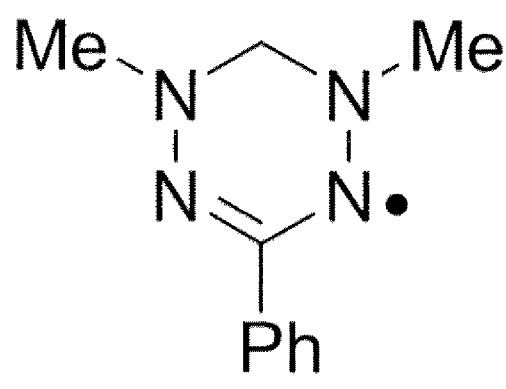

Our results indicating that verdazyl derivative (A) (see FIG. 7) is capable of mediating the SFRP of styrene, provide an interesting contrast to prior literature reports that triphenylverdazyl (B, FIG. 7) does not offer good molecular weight control (PDI's >1.7). This also provides evidence that differences in the verdazyl molecular structure can affect SFRP capabilities.

Our results also indicate that imidazole derivatives of verdazyls are effective and may work better than the phenyl derivative in that the reaction is slower but more controlled. The SFRP behavior of (B) with both styrene as well as n-butyl acrylate and methyl methacrylate will be studied. An important derivative targeted for study will be radicals (C) and (D), which are closely related to both A and B (FIG. 7); these four radicals provide all perturbations of whether the N-substituents are alkyl or aryl and whether $C_6$ is a carbonyl or an sp3 center. Comparisons between all three of these species will allow us to elucidate some of the specific structural factors that govern polymerization capabilities.

Figure 8:
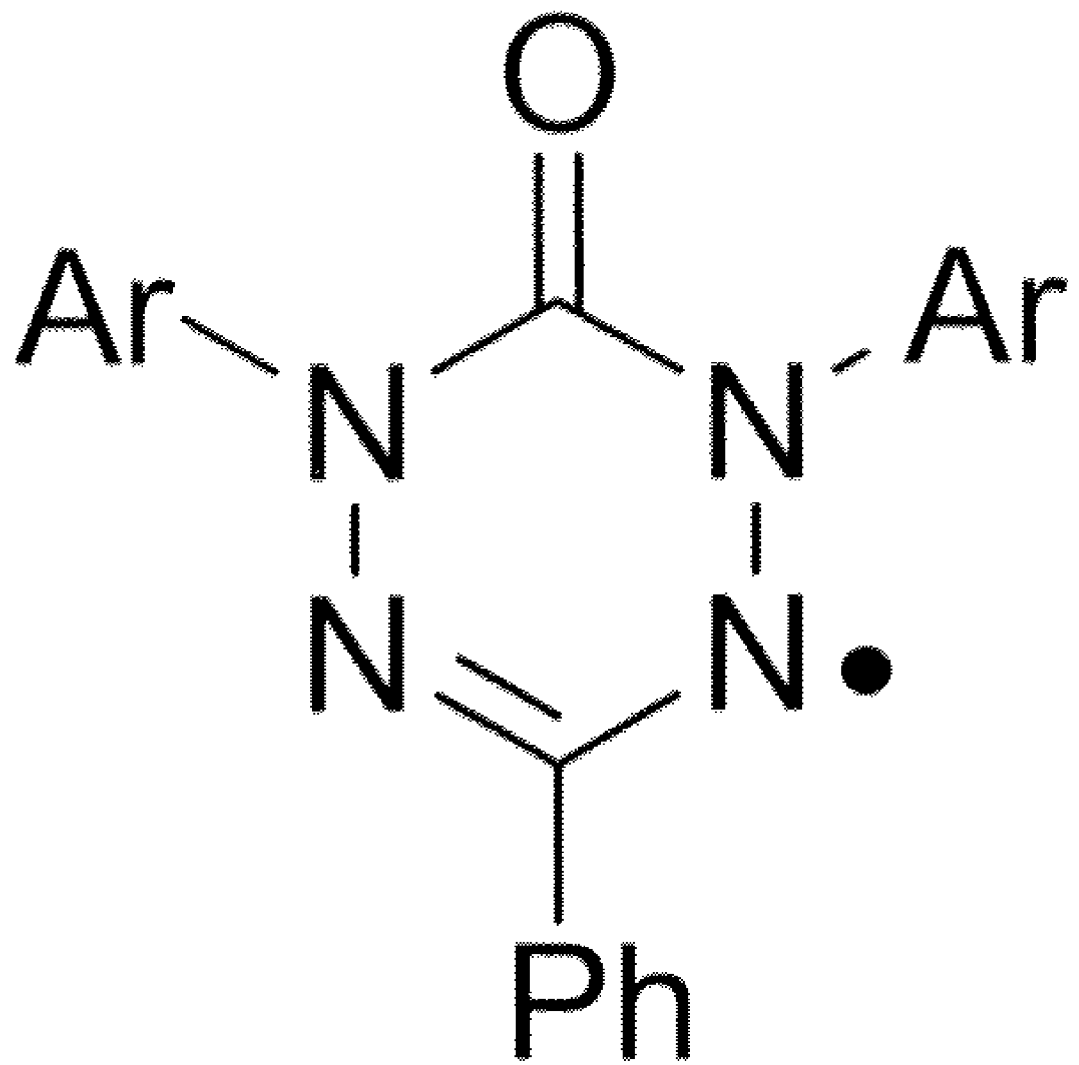
FIG. 8 shows the chemical structure of triarylverdazyl radicals in accordance with an embodiment of the disclosed invention.

It is well-established that $C_3$-substituents have very little effect on the electronic structure of verdazyl radicals because of the nature of the singly occupied molecular orbital. However, the nitrogen substituents can have stronger effects on the spin distribution and redox characteristics. To this end, we will prepare and study triarylverdazyl radicals having Ar=p-$Me_2NC_6H_4$ or Ar=p-$O_2NC_6H_4$ (see FIG. 8) as a means of assessing how polymerization behavior is affected by electronic effects. Analogous radicals lacking the carbonyl group will be studied if necessary.

Steric factors play a significant role in affecting the nitroxide-polymer bond through kinetic and/or thermodynamic stabilization of the stable free radical. Similar effects in analogous verdazyl chemistry are anticipated. To this end we will prepare verdazyls bearing bulkier substituents in the 1,3,5-positions, such as t-butyl or ortho-disubstituted aryl (e.g. mesityl).

Figure 9:
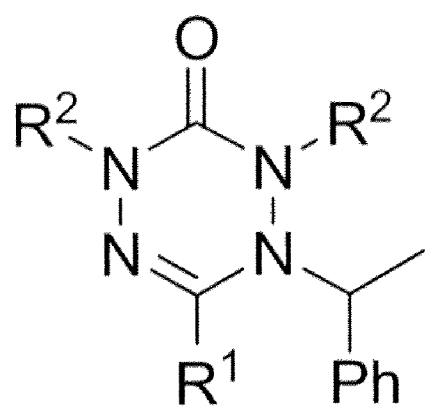
FIG. 9 shows the chemical structures of verdazyl unimers in accordance with an embodiment of the disclosed invention.
Figure 9:
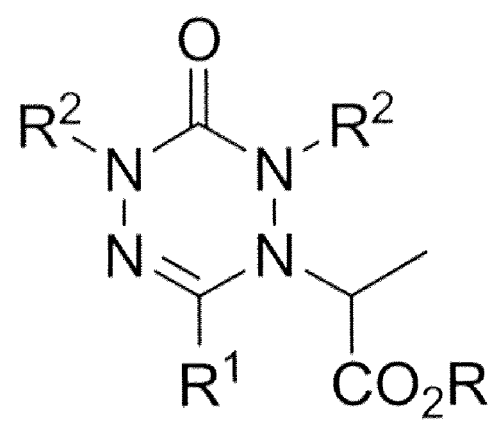

As described above, the polymerization runs are typically carried out under established SFRP conditions (i.e., monomer+x mol % radical+y mol % initiator). Complementary to these studies will be the synthesis and study of so-called "unimers"-unimolecular precursors based on the stable radical coupled to one monomer unit that are, upon dissociation, capable of acting as both initiator and SFRP mediator. Nitroxide-based "unimers" have been developed as single-component initiator/SFRP mediators, and they also have been useful as model systems with which to study the nature of the radical-polymer bond through studies of bond dissociation energies, polymerization rates, and byproduct formation. The utility of unimers as model compounds is the primary motivation behind the synthesis and study of verdazyl-based unimers having the structures shown in FIG. 9. By analogy to the nitroxide systems, the verdazyl unimers can be made either by coupling reactions of the radicals with and in situ generated monomer radical fragment, or by reduction of the radical to its anion followed by reaction with alkyl halides.

Figure 1:
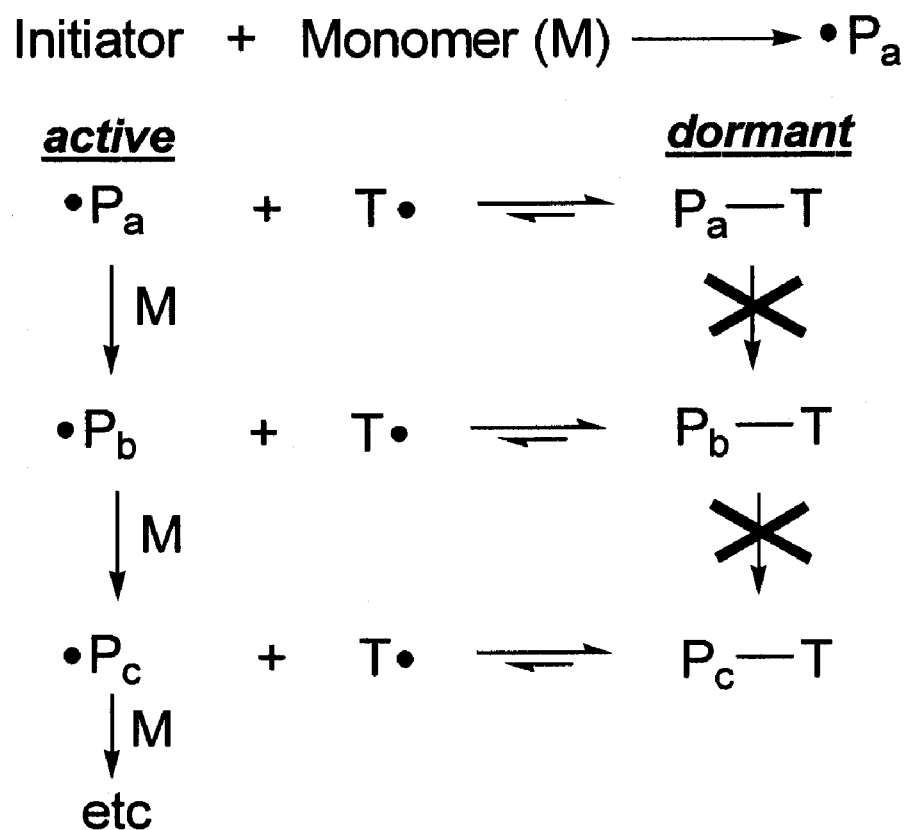
FIG. 1 is prior art, showing a generalized scheme for living radical polymerization.
Figure 2:
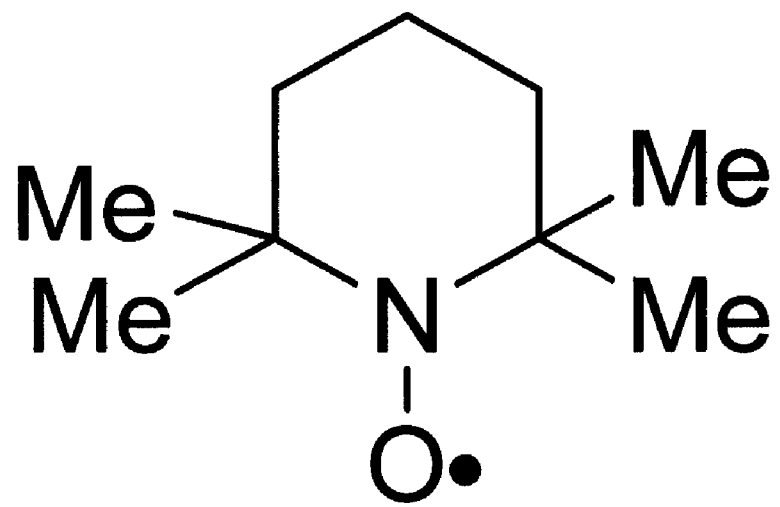
FIG. 2 is prior art showing the chemical structure of TEMPO.

We will explore the possibility of improving the SFRP process with verdazyls through the use of chemical additives. It is known that during the course of SFRP reactions, small amounts of termination reactions occur which gradually and irreversibly consume active polymer chains. This leads to a buildup of excess radical (nitroxide) which shifts the equilibria in FIG. 1 to the dormant side, thereby shutting down the reaction. There have been several approaches to circumventing this in the case of nitroxides by using additives which react with excess nitroxide. Traditional additives are strong acids, which induce nitroxide decomposition. Similar processes will be explored with verdazyls, and in addition to these studies we will explore the use of ascorbic acid as an additive: as is the case with nitroxides, verdazyls can be quantitatively reduced to diamagnetic species (tetrazines) with ascorbic acid. This may represent a new means of controlling stable radical concentrations.

The foregoing description of a method of synthesizing polymers using moderately unstable verdazyls describes the preferred methods and is not meant to be limiting. As would be apparent to one skilled in the art, there can be, for example, variation in the range of temperatures, additives, and R groups.

Specific Verdazyl Radicals Studied for Polymerization Behavior

Both verdazyls of type 2 and their corresponding unimers were examined

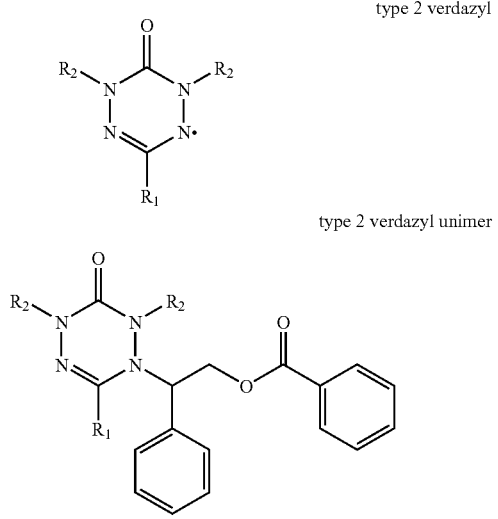

$R_2$=Ph, $R_1$=Ph $R_2$=Me, $R_1$=Ph $R_2$=Me, $R_1$=Me $R_2$=Me, $R_1$=Et $R_2$=Me, $R_1$=2-pyridyl $R_2$=Me, $R_1$=2-imidazolyl

We claim:

1. A method of synthesizing free-standing polymers from suitably selected polymerizable subunits, comprising:
providing suitably selected polymerizable subunits;
providing a unimer having a formula

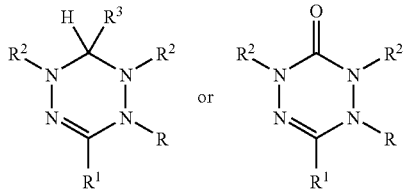

where at least one $R^2$ substituent is an alkyl group, the remaining R—$R^3$ substituents being selected from the group consisting of hydrogen, alkyl, aryl, 2-pyridyl and 2-imidazolyl;
inhibiting termination of said free standing polymer with said unimer; and
forming said free standing polymer, said free standing polymer having a monodispersity of from about 1.0 to about 1.5, and wherein said method is conducted at temperatures of from about 80 to about 140° C.

2. The method of claim 1 wherein said method is conducted at temperatures of from about 90 to about 100° C.

3. A composition for the synthesis of free standing polymers from suitably selected polymerizable subunits, said combination comprising:
suitably selected polymerizable subunits;
a unimer having a formula

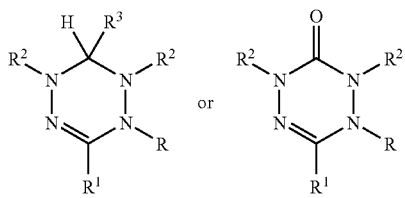

where at least one $R^2$ substituent is an alkyl group, the remaining R—$R^3$ substituents being selected from the group consisting of alky, aryl, 2-pyridyl and 2-imidazolyl; and
a terminator.

4. The method of claim 1 where $R^1$ is methyl, ethyl, phenyl, 2-pyridyl or 2-imidazolyl.

5. The method of claim 1 where at least one of $R^2$ is primary alkyl.

6. The method of claim 1 where at least one of $R^2$ is methyl.

7. The composition of claim 3 where $R^1$ is methyl, ethyl, phenyl, 2-pyridyl or 2-imidazolyl.

8. The composition of claim 3 where at least one of $R^2$ is primary alkyl.

9. The composition of claim 3 where at least one of $R^2$ is methyl.

10. A method of synthesizing free-standing polymers from suitably selected polymerizable subunits, comprising:
providing suitably selected polymerizable subunits;
providing a unimer where the unimer has a formula

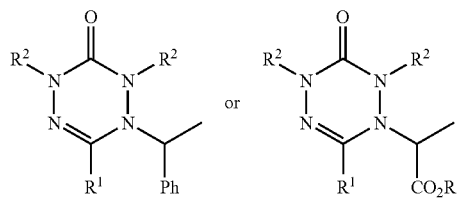

where at least one R² substituent is an alkyl group, the remaining R—R² substituents being selected from the group consisting of hydrogen, alkyl, aryl, 2-pyridyl and 2-imidazolyl
  inhibiting termination of said free standing polymer with said unimer; and
  forming said free standing polymer, said free standing polymer having a monodispersity of from about 1.0 to about 1.5. and wherein said method is conducted at temperatures of from about 80 to about 140° C.

11. A composition for the synthesis of free standing polymers from suitably selected polymerizable subunits, said combination comprising:
  suitably selected polymerizable subunits;
  a unimer where the unimer has a formula

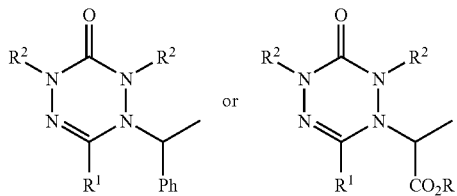

where at least one R² substituent is an alkyl group, the remaining R—R² substituents being selected from the group consisting of alkyl, aryl, 2-pyridyl and 2-imidazolyl; and
  a terminator.

* * * * *